No. 625,497. Patented May 23, 1899.
A. GAULIN.
SEALED LID FOR MILK CANS, MEAT CANS, OR THE LIKE.
(Application filed Jan. 6, 1897.)
(No Model.) 3 Sheets—Sheet 1.
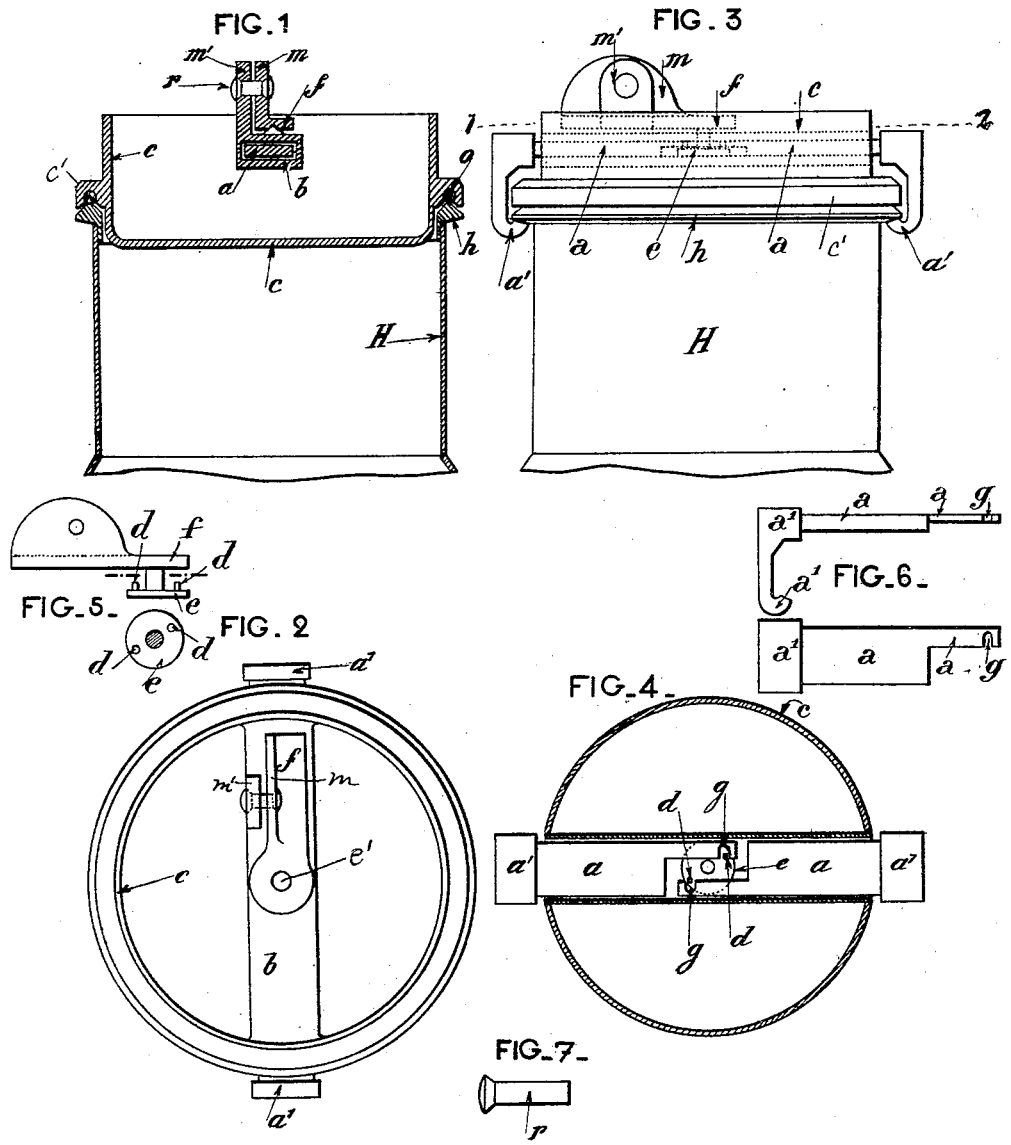

No. 625,497. Patented May 23, 1899.
A. GAULIN.
SEALED LID FOR MILK CANS, MEAT CANS, OR THE LIKE.
(Application filed Jan. 6, 1897.)

(No Model.) 3 Sheets—Sheet 2.

Witnesses:
W. C. Pinckney
C. Holloway

Inventor:
Auguste Gaulin,
By J. E. M. Bowen
Atty.

No. 625,497. Patented May 23, 1899.
A. GAULIN.
SEALED LID FOR MILK CANS, MEAT CANS, OR THE LIKE.
(Application filed Jan. 6, 1897.)
(No Model.) 3 Sheets—Sheet 3.
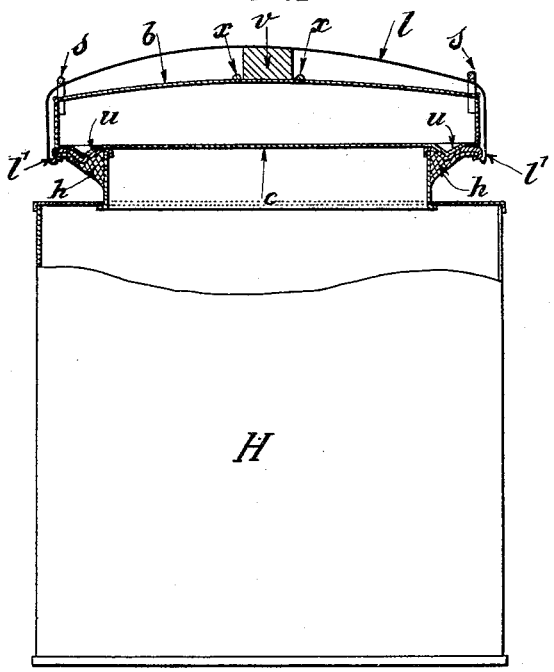
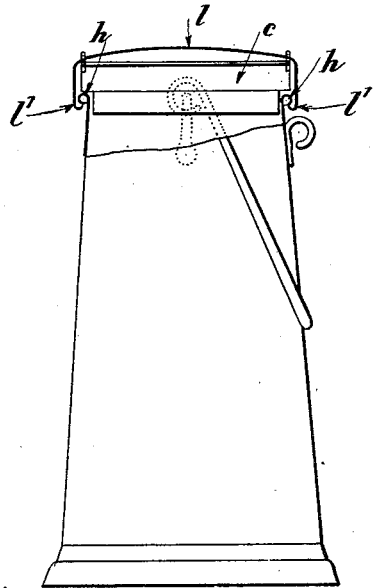
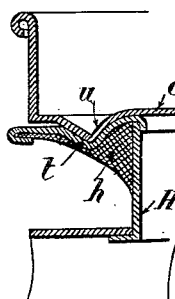
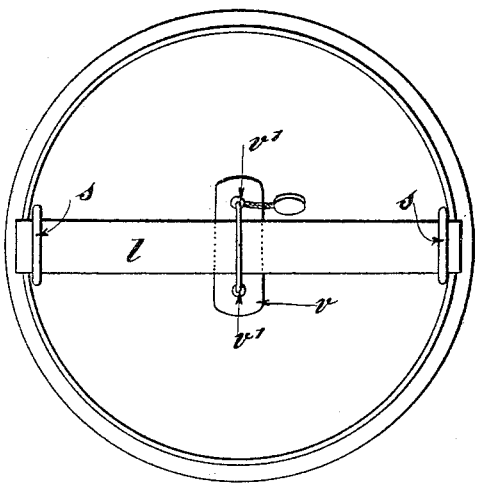
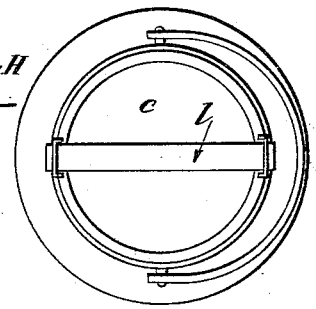
Witnesses:
W. C. Pinckney
C. Holloway
Inventor:
Auguste Gaulin,
By J. E. M. Bowen
Atty.

UNITED STATES PATENT OFFICE.

AUGUSTE GAULIN, OF PARIS, FRANCE.

SEALED LID FOR MILK-CANS, MEAT-CANS, OR THE LIKE.

SPECIFICATION forming part of Letters Patent No. 625,497, dated May 23, 1899.

Application filed January 6, 1897. Serial No. 618,125. (No model.)

*To all whom it may concern:*

Be it known that I, AUGUSTE GAULIN, a citizen of the Republic of France, residing at No. 86 Rue Myrha, Paris, France, have invented certain new and useful Improvements in Sealed Lids for Milk-Cans, Meat-Cans, or the Like, (for which I have obtained Letters Patent of France, No. 253,895, dated February 12, 1896,) of which the following is a specification.

My invention relates to improvements in closing devices for jars, cans, and other receptacles used for shipping milk or for similar purposes, such as preserving articles of food, it being the object of these improvements to fixedly secure the cover to the jar, can, &c., so as to absolutely prevent the opening of the same while in transit, to make it tight in a reliable and permanent manner, and finally to prevent fraud.

Figure 11:
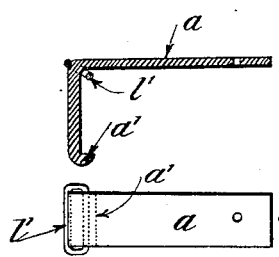
Figure 8:
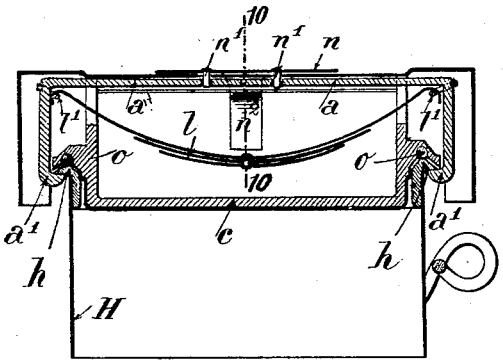
Figure 10:
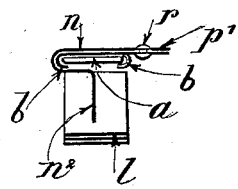
Figure 9:
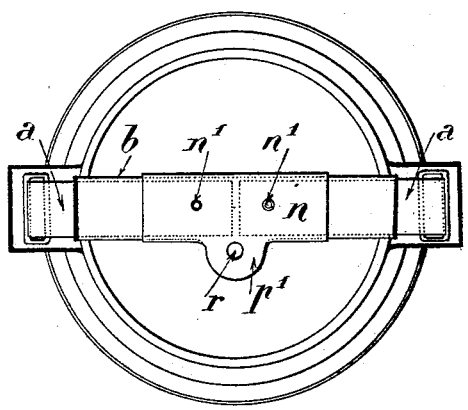

In the drawings accompanying this specification, Figures 1 to 5 represent a closing device for milk-jars embodying the distinguishing features of my invention. Fig. 1 is a vertical section of the closing device. Fig. 2 is a ground plan; Fig. 3, an elevation; Fig. 4, a horizontal section along line 1 2 in Fig. 3; Fig. 5, an elevation and a ground plan of parts of the eccentric lever mechanism whereby the closing device is opened. Fig. 6 shows in elevation and in ground plan one of the locking-bars. Fig. 7 shows a rivet for securing or sealing the closing device. Figs. 8 and 9 show in longitudinal section and in ground plan a slight variation of the closing device as applied to a milk-jar. Fig. 10 is a vertical section of a part of the closing device along line 10 10 in Fig. 8. Fig. 11 shows in vertical section and in ground plan one of the locking-bars of said closing device. Figs. 12 and 13 show in a vertical section and in ground plan a metallic preserving-jar provided with a modified form of my closing device. Fig. 14 illustrates, on an enlarged scale, a metallic joint which I may employ in connection with an apparatus as illustrated in Figs. 12 and 13 instead and in place of the joint wherein a flange made of felt, fiber, or rubber is used. Figs. 15 and 16 show in vertical section and in ground plan a small milk jar or can provided with a third variation of my closing device.

In the different constructions my improved closing device embodies three essential parts—the closing device proper, the joint, and the securing or safety device for preventing fraud.

Referring to Figs. 1 to 6, it will be seen that my closing device comprises two locking-bars $a\ a$, provided at their extreme ends with brackets or hooks designed to engage with and hook onto the under side of a small collar $h$, provided on the jar H, which is to be closed. The locking-bars $a\ a$ slide within the diametrical handle $b$, which is integral with cover $c$, and said locking-bars are so constructed that the end portion of each bar is provided with a transverse slot or recess $g$, into which a tenon $d$, secured to the upper face of a small disk or eccentric $e$, is made to enter, being actuated from the outside by means of lever $f$. The recesses $g\ g$ in the ends of the locking-bars being on opposite sides when the eccentric $e$ is turned around its axis $e'$ with the aid of lever $f$, the tenons $d$ will bring together or will move apart the locking-bars $a$ in such manner that the hooks $a'\ a'$ will either engage on each side with circular flange $h$ on jar H or will be withdrawn therefrom. The opening and closing are accomplished by the movement or displacement of locking-bars $a\ a$, withdrawing the hooks $a'\ a'$ from collar $h$ or bringing the same into engagement therewith in such manner that the weight of the jar when the same is placed in a vertical position can under no circumstances cause the same to open while in transit. The whole mechanism is located within the diametrical bar or handle $b$, soldered or riveted to the walls of cover $c$, which ordinarily is constructed in the form illustrated in Fig. 1. From the outside only the hooks $a'\ a'$ on the locking-bars and the lever $f$ for operating the eccentric $e$ are visible. When the cover is to be put in place, locking-bars $a\ a$ are first put in the position corresponding with the opened condition of the cover. The joint which closes the jar comprises a ring $o$, made of felt, fiber, asbestos, or rubber, of any suitable cross-section, preferably of circular form, which is squeezed in between the flanges $h$ and $c'$, made either angular or rounding, and which are provided on jar H and cover $c$. Such a joint is absolutely tight.

My closing device is made complete by attaching thereto a safety or protecting device which is so arranged that it is impossible to disturb the same without leaving a mark showing that the opening has been accomplished or that it has been attempted. The lever $f$ of the eccentric $e$ and the handle or arm $b$ are provided with two perforated lugs $m$ and $m'$, which are placed in corresponding positions when the jar is closed, Figs. 1, 2, and 3. I secure the same to each other by means of a rivet $r$, Fig. 7, or by means of a lead seal which I insert in the same with the aid of a pair of pincers. Different pincers may be used each day, and in consequence the marks on the seal may be so varied as to make control easy and to prevent fraud. The jar can be opened by introducing a blade between the two lugs $m$ and $m'$ and by cutting thereby the shank of the rivet, which may be of circular, prismatic, or any other cross-section.

In Figs. 8, 9, 10, and 11 I have illustrated a slight variation of my closing device applied to a milk jar or can. Corresponding letters of reference refer to corresponding parts. This closing device also comprises two locking-bars $a$ $a$, provided with hooks $a'$ $a'$ and sliding within the handle $b$ of cover $c$; but these locking-bars are actuated through the rings $l'$ $l'$ by an arched spring $l$, made of one or, preferably, more thicknesses. When the jar is closed, the hooks $a'$ $a'$ on the locking-bars engage on each side with the flange $h$ on jar H, which flange is circular and slightly inclined, there being a constant tendency between the hooks and said flange to engage more closely with each other, owing to the tension of the spring imparted to the locking-bars through rings $l'$ $l'$. When the jar is to be opened, the operator's fingers must be placed underneath spring $l$, the palm of the hand resting against handle $b$, while the fingers flatten the spring, whereby the ends of the spring are forced outward and actuate locking-bars $a$ $a$, sliding within handle $b$, so as to move the same away from each other in a parallel direction, and thereby cause their hooks $a'$ $a'$ to withdraw from flange $h$ on the jar. The joint is made by means of the ring $o$, of felt, fiber, asbestos, or rubber, inserted between flanges $h$ and $c$, made angular or round, on jar H and cover $c$, whereby a perfectly tight fit is secured. For the purpose of sealing the jar when the cover $c$ is in position an angular piece $n$ is placed upon the handle in such manner that its two tenons $n'$ $n'$ are made to fit into two holes provided for such purpose in the ends of locking-bars $a$ $a$, so as to prevent any displacement of the same. The arm of angle-piece $n^2$, which is placed in a vertical position, prevents any interference of the hand with spring $l$. Finally, handle $b$ and piece $n$ are each provided with a perforated lug $p$ or $p'$, and these two lugs $p$ $p'$ are united by means of a seal or rivet $r$, made of lead and bearing an impression, which can be modified from day to day.

In the construction shown in Figs. 12, 13, and 14 the closing of a preserving-jar H is accomplished by the use of a single spring $l$, curved longitudinally above handle $b$ of cover $c$ and deflected at its ends, so as to form hooks $l'$ $l'$, adapted to engage with rim $h$ on jar H. Spring $l$ is maintained in position upon the cover by eyes $s$ $s$, soldered to the wall of such cover. When the jar is to be opened, one flattens out spring $l$, whereby its two ends are made to swing outward, and hooks $l'$ $l'$ are detached from flange $h$.

In all the constructions described the cover-handle is a diametrical bar or tube, being non-rotatable and stationary in relation to the cover.

The joint can be made as described above, but I can also employ a joint which is entirely metallic. Upon the wall of jar H is supported and tightly secured a metallic flange $h$, which is suitably chased, so as to present upon its upper surface a circular groove $t$ of angular cross-section or made more or less rounding. Cover $c$ is also made of metal and chased so as to present upon its lower face a circular ridge $u$ of a suitable cross-section and which upon the closing of the jar engages exactly with the groove upon the jar and forms there a joint made entirely of metal which is absolutely tight and permanent. To prevent fraud, I force, after closing the jar, a wedge $v$, made of metal, between handle $b$ of cover $c$ and spring $l$. Two shoulders $x$ $x$ may be placed upon the handle transversely, so as to be able to force the wedge into the desired position and to prevent displacement. Finally, a metallic thread can be passed through holes $v'$ $v'$, which are placed in the ends of wedge $v$, surrounding thereby handle $b$ and spring $l$ and sealing it by means of lead seals with varying designs.

In Figs. 15 and 16 I have illustrated a small milk jar or can H with a closing device having a single spring $l$, curved longitudinally above the handle of cover $c$ and deflected at its ends, so as to form hooks $l'$ $l'$, which engage with the flange $h$ of jar H.

I reserve the right to apply any one of the above constructions either to milk-jars or preserve-jars or to any similar receptacles.

Having thus described my invention, what I claim as new, and desire to secure by Letters Patent, is—

1. The combination of a receptacle, a cover, a stationary handle-bar, hooks $a'$ engaging the top of the receptacle, said hooks having arms along the handle, a plate pivoted to the handle and having pins engaging said arms, a handle for turning said plate to move the hooks, and a locking and sealing rivet adapted to be easily cut connecting said arm at a distance from its pivot to the handle.

2. The combination of a receptacle, a cover, a handle-bar having an extension $m'$, hooks $a'$ engaging the top of the receptacle, said hooks having arms along the handle, a plate pivoted to the handle and having pins engaging said arms, a handle for turning said plate to move the hooks, said handle having an extension $m$ and a locking and sealing rivet connecting the parts $m$ $m'$.

3. The combination of a receptacle, a cover having a diametrical hollow handle, hooks $a'$ having arms movable within the hollow handle, and a plate pivoted to the handle and having pins adapted to engage and move said arms within the handle.

4. A cover of dish-like shape, a hollow diametrical handle, and holding devices for the cover movable within said hollow handle, and an arm pivoted to the outside of the handle and connected to the holding devices.

5. A cover of dish-like form, a diametrical hollow handle, the ends of said handle being open and L-shaped hooks $a'$ the long arms of which pass through said openings into the hollow handle, and means for moving the same in and out.

In witness whereof I have hereunto set my hand in presence of two witnesses.

AUGUSTE GAULIN.

Witnesses:
ATHANASE AUGUSTE GAULIN,
GEORGES LAURENS.